(12) United States Patent
Honbo et al.

(10) Patent No.: US 6,835,215 B2
(45) Date of Patent: Dec. 28, 2004

(54) NON-AQUEOUS SECONDARY BATTERY AND A METHOD OF MANUFACTURING GRAPHITE POWDER

(75) Inventors: Hidetoshi Honbo, Hitachi (JP); Seiji Takeuchi, Hitachioota (JP); Hideto Momose, Hitachi (JP); Tatsuo Horiba, Hitachi (JP); Yasushi Muranaka, Hitachinaka (JP); Yoshito Ishii, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 314 days.

(21) Appl. No.: 10/021,093

(22) Filed: Dec. 19, 2001

(65) Prior Publication Data

US 2002/0045100 A1 Apr. 18, 2002

Related U.S. Application Data

(62) Division of application No. 09/473,300, filed on Dec. 28, 1999, now Pat. No. 6,383,467, which is a division of application No. 08/630,501, filed on Apr. 10, 1996, now Pat. No. 6,268,086.

(30) Foreign Application Priority Data

Apr. 10, 1995 (JP) ............................... 7-84196

(51) Int. Cl.$^7$ .......................... H01M 6/00; H01M 4/58; C01B 31/04; C01D 3/00
(52) U.S. Cl. ................ 29/623.3; 429/231.4; 429/231.8; 423/448; 423/449.3
(58) Field of Search .................... 429/231.4, 231.8; 29/623.3; 423/448, 449.3

(56) References Cited

U.S. PATENT DOCUMENTS

| | | | |
|---|---|---|---|
| 4,013,760 A | 3/1977 | Huschka | 423/449 |
| 4,221,773 A | 9/1980 | Tsukagoshi et al. | 423/445 |
| 5,028,500 A | * 7/1991 | Fong et al. | 429/224 |
| 5,340,670 A | 8/1994 | Takami et al. | 429/194 |
| 5,554,462 A | 9/1996 | Flandrois et al. | 312/236 |
| 5,672,327 A | 9/1997 | Bennett et al. | 423/448 |
| 6,576,369 B1 | * 6/2003 | Moriguchi et al. | 429/231.8 |

FOREIGN PATENT DOCUMENTS

| | | |
|---|---|---|
| EP | 0573266 | 12/1993 |
| EP | 0660432 | 6/1995 |
| GB | 1087046 | 12/1967 |
| JP | 03-041161 | * 2/1991 |
| JP | 6-168724 | 6/1994 |
| JP | 6-168725 | 6/1994 |
| JP | 6-239607 | 8/1994 |
| JP | 6-318459 | 11/1994 |

* cited by examiner

*Primary Examiner*—Patrick Ryan
*Assistant Examiner*—Thomas H. Parsons
(74) *Attorney, Agent, or Firm*—Antonelli, Terry, Stout & Kraus, LLP

(57) ABSTRACT

Provided is a carbon material having a superior reversibility in lithium intercalation-deintercalation reaction, and a non-aqueous secondary battery using the carbon material as an active material for a negative electrode, which has a high energy density and an excellent rapid charging and discharging characteristics. Graphite powder having a maximum particle diameter of less than 100 μm and an existing reaction of rhombohedral structure in the crystalline structure of less than 20% is used as an active material for the negative electrode of the non-aqueous secondary battery. The graphite powder can be obtained by pulverizing raw graphite with a jet mill, and subsequently treating the powder at a temperature equal to or higher than 900°C.

10 Claims, 5 Drawing Sheets

NON-AQUEOUS SECONDARY BATTERY AND A METHOD OF MANUFACTURING GRAPHITE POWDER

This application is a Divisional application of application Ser. No. 09/473,300, filed Dec. 28, 1999, now U.S. Pat. No. 6,383,467, which is a Divisional application of application Ser. No. 08/630,501, filed Apr. 10, 1996, now U.S. Pat. No. 6,268,086.

BACKGROUND OF THE INVENTION

The present invention relates to a carbon material which intercalates into or deintercalates from lithium, and to a method for manufacturing the same. In particular, the present invention relates to a lithium secondary battery, which uses carbon material as a negative electrode active material, having a high energy density and a long life. The lithium battery is suitable for use in portable apparatus, electric automobiles, power storage, etc.

The lithium secondary battery using lithium metal for the negative electrode has some problems relating to safety. For example, lithium easily deposits like dendrite on the lithium metal negative electrode during repeated charging and discharging of the battery, and if the dendritic lithium grows to a positive electrode, an internal short circuit will be caused between the positive electrode and the negative electrode.

Therefore, a carbon material has been proposed as the negative electrode active material in place of lithium metal. Charge and discharge reactions involve lithium ion intercalation into the carbon material and deintercalation from the carbon material, and so lithium is hardly deposited like dendrite. As for the carbon material, graphite is disclosed in JP-B-62-23433 (1987).

The graphite disclosed in JP-B-62-23433 (1987) forms an intercalation compound with lithium, because of intercalation or deintercalation of lithium. Thus, graphite is used as a material for the negative electrode of the lithium secondary battery. In order to use graphite as the negative active material, it is necessary to pulverize the graphite to increase the surface area of the active material, which constitutes a charge and discharge reaction field, so as to allow the charging and discharging reactions to proceed smoothly. Desirably, it is necessary to pulverize the graphite to powder having a particle diameter equal to or less than 100 $\mu$m. However, as is apparent from the fact that graphite is used as a lubricating material, the graphite easily transfers its layers. Therefore, its crystal structure is changed by the pulverizing process, and formation of the lithium intercalated compound might be influenced by undesirable effects of the pulverizing process. Accordingly, the graphite after the pulverizing process has a great deal of crystalline structural defects. In a case when graphite is used as an active material for the negative electrode of the lithium secondary battery, a disadvantage results in that a large capacity can not be obtained. Furthermore, preferable performances of rapid charging and discharging are not obtained because the lithium intercalation-deintercalation reaction is disturbed by the above defects.

SUMMARY OF THE INVENTION

The object of the present invention is to solve the above problems, to provide a carbon material having a large lithium intercalation-deintercalation capacity and a method for manufacturing the same, and to provide a non-aqueous secondary battery which has a large capacity and is superior in its rapid charging and discharging characteristics using the above-mentioned materials.

The crystalline structure of the graphite powder relating to the present invention has a feature that an existing fraction of the rhombohedral structure in the crystalline structure of the graphite is small (equal to or less than 20%). Another feature is that an existing fraction of the hexagonal structure is great (at least 80%). The above existing fractions of the rhombohedral structure and the hexagonal structure can be determined by analyzing the intensity ratio of the peaks in X-ray diffraction of the material.

The graphite powder relating to the present invention is manufactured by a method comprising the steps of graphitizing treatment (heating at least 2000° C.) of raw material such as oil cokes and coal cokes, pulverizing the graphitized raw material to powder, sieving the powder for obtaining the maximum particle diameter equal to or less than 100 $\mu$m, heating the powder to at least 900° C. as a heat treatment, and further heating the powder to at least 2700° C. for eliminating impurities such as Si. For instance, when the powder is heated to at least 2700° C., Si, which is a main component of the impurities, can be reduced to less than 10 ppm. The heat treatment of the powder for eliminating impurities can be omitted depending on the content of the impurities in the raw material. In the pulverizing process, various conventional pulverizers can be used. However, a jet mill is preferable, because pulverization with the jet mill generates the minimum destruction of the graphite crystalline structure in the raw material.

Furthermore, the graphite powder relating to the present invention can be obtained by immersing into an acidic solution containing at least one compound selected from a group consisting of sulfuric acid, nitric acid, perchloric acid, phosphoric acid, and fluoric acid as an immersing treatment, after pulverizing the raw graphite to obtain graphite powder having a particle diameter equal to or less than 100 $\mu$m, subsequently washing with water, neutralizing, and drying.

The non-aqueous secondary battery for achieving the object of the present invention can be manufactured by using the graphite powder relating to the present invention as the negative electrode active material, and the positive electrode is desirably composed of a material comprising a compound expressed by a chemical formula of $Li_xMO_2$ (where; X is in a range from zero to 1, and M is at least any one of chemical elements selected from a group of Co, Ni, Mn and Fe), or $LiMn_2O_4$, that is a lithium transient metal complex oxide.

The active materials for the battery are generally used in the form of a powder in order to facilitate the charging and discharging reaction by increasing the surface area of the active material, which constitutes a reaction field of the charging and discharging reaction. Therefore, the smaller the particle size of the powder is, the more will performance of the battery be improved. Furthermore, when the electrode is manufactured by applying an agent mixed with the active material and a binding agent to a current collector, the particle diameter of the active material is desirably equal to or less than 100 $\mu$m in view of applicability and maintaining preciseness of thickness of the electrode.

As for the negative electrode active material for the lithium secondary battery, natural graphite, artificial graphite, and others are disclosed. However, for the above described reason, it is necessary to pulverize these materials. Therefore, in the pulverizing process, various graphite powders having a is diameter equal to or less than 100 $\mu$m were prepared with various pulverizing methods using a ball mill, a jet mill, a colloidal mill and other apparatus, for various times. And, the lithium intercalation-deintercalation capacity of the various graphite powders were determined for determining a superior material for the negative electrode material of the lithium secondary battery.

However, the graphite powder obtained by the above method had lithium intercalation-deintercalation amounts per weight in a range of 200–250 mAh/g, and their capacities as the material for the negative electrode of the lithium secondary battery were not enough.

In order to investigate the reason for the small capacity, crystalline structures of the above various graphite samples were determined by an X-ray diffraction method. FIG. 1 indicates an example of the results. Four peaks can be observed in a range of the diffraction angle (2θ, θ: Bragg angle) from 40 degrees to 50 degrees in the X-ray diffraction pattern. The peaks at approximately 42.3 degrees and 44.4 degrees are diffraction patterns of the (100) plane and the (101) plane of hexagonal structure of the graphite, respectively. The peaks at approximately 43.3 degrees and 46.0 degrees are diffraction patterns of the (101) plane and the (102) plane of the rhombohedral structure of the graphite, respectively. As explained above, it was apparent that there were two kinds of crystalline structure in the pulverized graphite.

Further, the existing fraction (X) of the rhombohedral structure in the graphite powder was calculated by the following equation (Equation 1) based on the data of the observed peak intensity ($P_1$) of the (100) plane of the hexagonal structure, the observed peak intensity ($P_2$) of the (101) plane of the rhombohedral structure, and a theoretical relationship of the intensity ratio in the X-ray pattern of graphite. As a result, it was revealed that the graphite having the rhombohedral structure was contained by approximately 30% in all the graphite pulverized equal to or less than 100 μm in particle diameter.

$$X=3P_2/(11P_1+3P_2) \quad \text{(Equation 1)}$$

Similarly, the existing fraction (X) of the rhombohedral structure of the graphite powder was verified by the relationship of the observed peak intensity ($P_1$) of the (100) plane of the hexagonal structure, the observed peak intensity ($P_3$) of the (102) plane of the rhombohedral structure, and the theoretical relationship of the intensity ratio in the X-ray pattern of the graphite. In this case, the following equation 2 was used instead of the equation 1. As a result, it was confirmed that graphite having the rhombohedral structure was contained by approximately 30% in all the graphite pulverized equal to or less than 100 μm in particle diameter.

$$X=P_3/(3P_1+P_3) \quad \text{(Equation 2)}$$

The reason for existence of the two kinds of crystalline structure is assumed to be that the graphite itself has a lubricating property, and the original graphite having a hexagonal structure transforms to graphite having rhombohedral structure by the pulverizing process with strong shocks. Graphite powder of a few microns in particle diameter obtained by further continued pulverization had a significantly broadened X-ray diffraction peak ($P_4$) at the (101) plane of the hexagonal structure, and it was revealed that the content of amorphous carbon in the graphite was increased because the half band width of the peak was increased. Accordingly, the reason for the small lithium intercalation-deintercalation capacity of the conventional graphite powder can be assumed to be due to the fact that the crystalline structure of the graphite has been transformed to the rhombohedral structure and has generated the amorphous carbon, with the result that the lithium intercalation-deintercalation reaction is disturbed by the rhombohedral structure and the amorphous carbon.

Analysis of the impurities of the graphite powder revealed that impurities such as Si, Fe, and others were present in an amount more than 1000 ppm. Naturally, in addition to the impurities contained in the raw material, impurities from a processing apparatus, such as a ball mill, a jet mill, and the like, can be mixed into the graphite during the pulverizing process. Therefore, the influence of the above impurities can be assumed as another reason for the small capacity, in addition to the above formation of the rhombohedral structure and amorphous carbon.

In accordance with the present invention, a graphite powder having a particle diameter equal to or less than 100 μm, wherein the content of the above described rhombohedral structure is less than 30% and the content of the amorphous carbon is small, has been developed. Additionally, the content of Si in particular, which is the main component of the impurities in the graphite powder, has been decreased to an amount equal to or less than 10 ppm. Therefore, extremely high purity is one of the features of the graphite relating to the present invention. The particle diameter equal to or less than 100 μm is determined with an intention to use the graphite for a battery, as described previously. Therefore, when the graphite of the present invention is used for other purposes, the particle diameter of the graphite is not necessarily restricted to a size equal to or less than 100 μm.

Hereinafter, details of the graphite powder relating to the present invention, and the method for manufacturing the same will be explained.

Two methods (manufacturing method 1 and manufacturing method 2) for obtaining graphite having a small fraction of the rhombohedral structure are disclosed.

(Manufacturing Method 1)

As for raw material (raw graphite) for the graphite powder of the present invention, both natural graphite and artificial graphite can be used. In particular, flaky natural graphite is preferable. Among the raw graphite, the one having a maximum diffraction peak in the X-ray diffraction pattern by the CuKα line which appears at a diffraction angle (2θ, θ: Bragg angle) in a range from 26.2 degrees to 26.5 degrees, that is, where an interval between two graphite layers is equal to or less than 0.34 nm, is desirable. As a result, a graphite powder containing a small amount of the rhombohedral structure can be obtained from the high crystalline raw material.

As for the pulverizing apparatus for crushing the raw graphite to a particle diameter equal to or less than 100 μm, a jet mill is desirable. The reason is that the amorphous carbon is generated less with the jet mill than in the case when another pulverizing apparatus is used.

The pulverized raw graphite (raw powder) contains graphite having a rhombohedral structure by approximately 30% as previously described. Then, in accordance with the present manufacturing method 1, the existing fraction of the rhombohedral structure is decreased by the following heat treatment.

The heat treatment is performed to at least 900° C. under an inert gas atmosphere. As for the inert gas, nitrogen gas, argon gas, and the like is used. The inert gas atmosphere can also be maintained by covering the raw powder with cokes to seal it from the atmosphere.

The heat treatment is the most important process in the present invention for transforming the rhombohedral structure to a hexagonal structure. It is necessary to perform the heat treatment after pulverization of the raw graphite (more preferably, at the last stage of the graphite powder manufacturing process of the present invention).

If the heat treatment is performed before the pulverization of the graphite and subsequently the graphite is pulverized, graphite powder containing a rhombohedral structure in a quantity as small as possible, which is the object of the present invention, can not be obtained. The graphite powder containing the rhombohedral structure graphite in a quantity as small as possible can be obtained only by employing the heat treatment after the pulverizing process (more preferably, at the last stage of the graphite powder manufacturing process of the present invention) as the present invention proposes.

The raw graphite powder contains Al, Ca, Fe, and particularly a large amount of Si, as impurities. The impurities can be eliminated by heating and sublimating the materials to at least 2700° C. Therefore, the heating temperature in the heat treatment is preferably at least 2700° C. in order to perform a purification treatment concurrently.

(Manufacturing Method 2)

The raw graphite and the pulverizing process is the same as the above manufacturing method 1.

The graphite powder of the present invention can be obtained by treating the graphite powder obtained by the pulverizing process with an acidic solution containing at least one compound selected from a group consisting of sulfuric acid, nitric acid, perchloric acid, phosphoric acid, and fluoric acid, and subsequently washing with water, neutralizing, and drying. During the treatment, a compound is formed with anions in the above acidic solution and the graphite, and the rhombohedral structure graphite is eliminated by the formation of the compound. The anions from the acidic solution in the compound are eliminated from the compound during the washing, the neutralizing, and the drying, and the graphite powder relating to the present invention can be obtained.

The crystalline structure of the graphite powder of the present invention obtained by the above manufacturing methods 1 and 2 was analyzed by X-ray diffraction. The ratio of $P_1$ and $P_2$, $(P_2/P_1)$, was less than 0.92, and the half band width of $P_4$ was less than 0.45 degrees. The ratio of $P_1$ and $P_3$, $(P_3/P_1)$, was less than 0.75.

By substituting the above observed data for the equations 1 and 2, the fact that the existing fraction of the rhombohedral structure has been decreased to less than 20% and the existing fraction of the hexagonal structure has been increased at least 80% was confirmed. Simultaneously, the content of Si was confirmed to be less than 10 ppm from the result of impurity analysis.

Then, an electrode was prepared using the graphite powder of the present invention as an active material, and the lithium intercalation-deintercalation is capacity was studied. As a result, the lithium intercalation-deintercalation capacity of the graphite powder of the present invention was 320–360 mAh/g per unit weight of the active material, and the capacity was significantly improved in comparison with the capacity of the conventional graphite material (200–250 mAh/g). Furthermore, it was found that the preferable existing fraction of the rhombohedral structure was equal to or less than 10%, because the less the existing fraction of the rhombohedral structure in the graphite powder of the present invention is, the more will the capacity be increased. Where the fraction of the rhombohedral structure is 10% or less, and from Equations 91) and 92) herein, respectively, $P_2/P_1$ is 0.41 or less and $P_3/P_1$ is 0.33 or less.

Accordingly, the rhombohedral structure is evidently a crystalline structure which hardly will intercalate or deintercalate lithium. Therefore, it is assumed that the high lithium intercalation-deintercalation capacity of the graphite powder of the present invention is achieved by especially decreasing the existing fraction of the rhombohedral structure and increasing the existing fraction of the hexagonal structure.

The feature of the lithium secondary battery of the present invention is in using the graphite powder of the present invention as the negative active material. The lithium secondary battery relating to the present invention has a large load capacity, and a high energy density can be realized.

As a result of an evaluation of the characteristics of the lithium secondary battery of the present invention, it was confirmed that the lithium secondary battery of the present invention had a superior performance in rapid charging and discharging characteristics, and a decreasing ratio of the capacity was improved at least 30% in comparison with the conventional lithium battery under a same rapid charging and discharging condition. The reason for the improvement can be assumed to relate to the fact that the reversibility for the lithium intercalation-deintercalation reaction of the graphite of the present invention is improved in comparison with the conventional carbon material by decreasing the existing fraction of the rhombohedral structure and eliminating the influence of the impurities, such as Si.

As the positive active material for the lithium secondary battery of the present invention, materials such as $Li_xCoO_2$, $Li_xNiO_2$, $Li_xMn_2O_4$, (where, X is in a range 0–1) and the like are desirable because a high discharge voltage of at least 3.5 V can be obtained, and the reversibility of the charging and discharging of the positive electrode itself is superior.

As for the electrolytic solution, a mixed solvent composed of ethylene carbonate mixed with any one selected from a group consisting of dimethoxyethane, diethylcarbonate, dimethylcarbonate, methylethylcarbonate, γ-butylolactone, methyl propionate, and ethyl propionate, and at least one of the electrolytes selected from a group consisting of salts containing lithium such as $LiClO_4$, $LiPF_6$, $LiBF_4$, $LiCF_3SO_3$, and the like are used. It is desirable to adjust the lithium concentration in a range 0.5–2 mol/l, because the electric conductivity of the electrolytic solution will be favorably large.

DETAILED DESCRIPTION OF THE EMBODIMENTS

Figure 1:
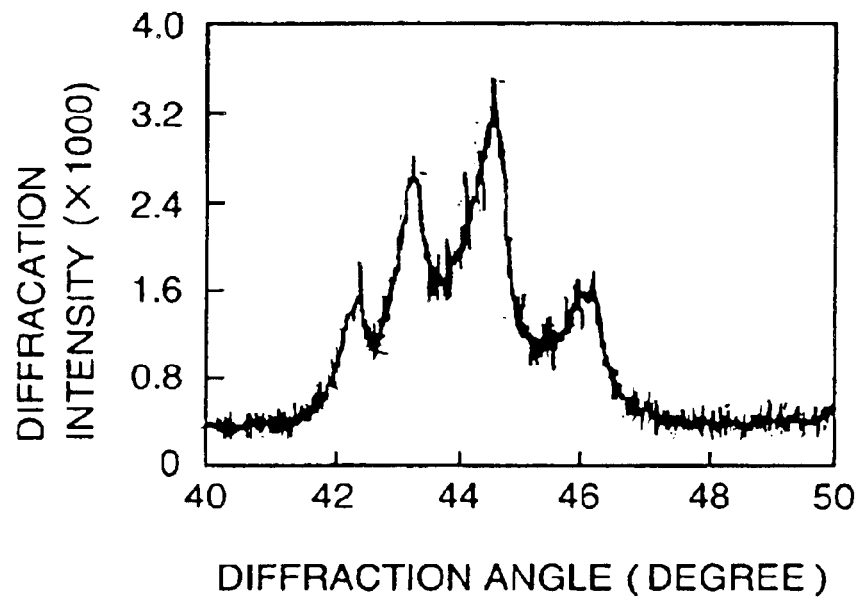
FIG. 1 is a graph which indicates an X-ray diffraction pattern of conventional graphite.

Referring to the drawings, embodiments of the present invention will be explained hereinafter.

Embodiment 1

Flaky natural graphite which was produced from Madagascar was used as the raw material, and the raw material was pulverized to form a powder, of which the particle diameter was equal to or less than 46 μm, using a jet mill. The powder was sieved to obtain a raw material powder. The average diameter of the raw material powder was 8.0 μm. Subsequently, the raw material powder was processed with a heat treatment by heating at 900° C. or 2850° C. for ten days under a nitrogen atmosphere, and the graphite powder of the present invention was obtained.

The crystalline structures of the graphite powder of the present invention and the raw material powder were analyzed by an X-ray diffraction method using an apparatus RU-200 made by Rigaku Denki, and the impurity content was analyzed by inductively coupled plasma spectrometry (ICP) using an apparatus P-5200 made by Hitachi.

Figure 2:
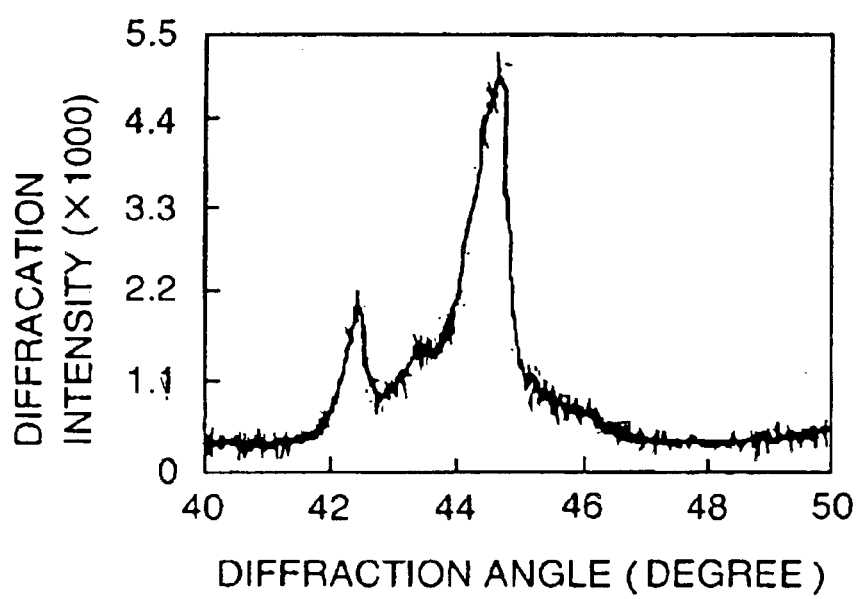
FIG. 2 is a graph which indicates an X-ray diffraction pattern of graphite powder relating to the embodiment 1 of the present invention (heat treatment temperature: 900° C.)
Figure 3:
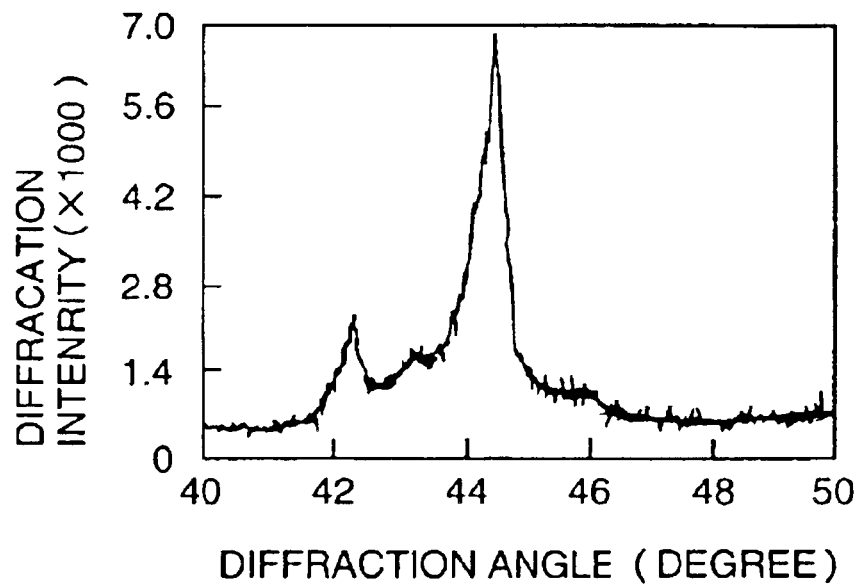
FIG. 3 is a graph which indicates an X-ray diffraction pattern of the graphite powder relating to the embodiment 1 of the present invention (heat treatment temperature: 2850° C.)

The X-ray diffraction patterns of the graphite powder of the present invention, which have been observed under a condition of X-ray tube voltage of 40 kV, X-ray tube current of 150 mA, and X-ray source of CuKα line, are shown in FIGS. 2 and 3. FIG. 2 is the pattern obtained by the heat treatment at 900° C., and FIG. 3 is the pattern obtained by the heat treatment at 2850° C. The X-ray diffraction patterns of the graphite powder of the present invention in both FIG. 2 and FIG. 3 indicate that the peaks at diffraction angles of 43.3 degrees and 46.0 degrees, both of which belong with the rhombohedral structure, are decreased by either of the above heat treatments.

The amount of Si contained in the graphite powder of the present invention as an impurity was 1140 ppm when the heating temperature was 900° C., and 27 ppm when the heating temperature was 2850° C. Therefore, it is revealed that a highly purified graphite powder, of which Si is eliminated, can be obtained by heat treatment at a high temperature at least 2700° C., by which Si can be eliminated.

Comparative Example 1

Figure 4:
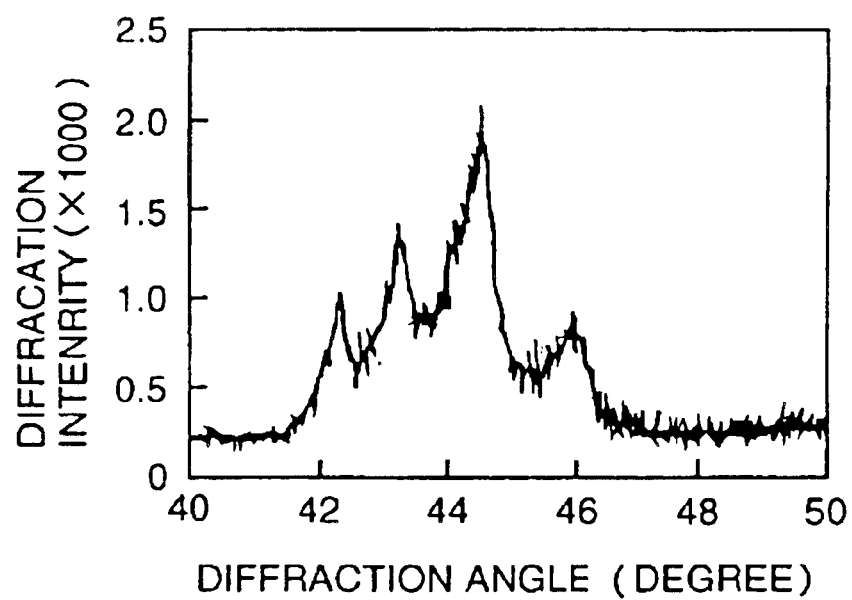
FIG. 4 is a graph which indicates an X-ray diffraction pattern of the graphite powder prepared in the comparative example 1.

In order to provide a comparison with the embodiment of the present invention, non-pulverized raw graphite was heated at 2850° C., and subsequently pulverized to obtain graphite powder. The X-ray pattern of the graphite powder obtained by the above process is shown in FIG. 4. It is apparent from FIG. 4 that the peaks at diffraction angles of 43.3 degrees and 46.0 degrees, both of which belong to the rhombohedral structure, are not decreased. That means that the rhombohedral structure can not be eliminated by the above process.

Embodiment 2

Figure 5:
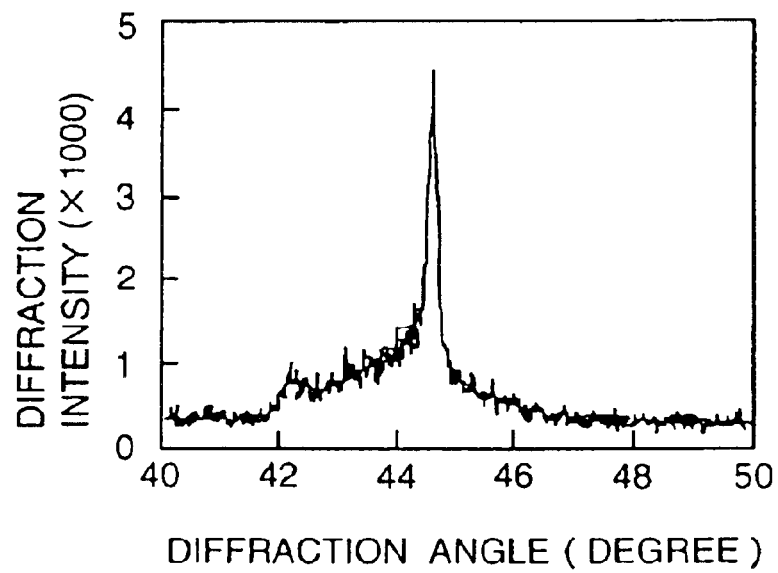
FIG. 5 is a graph which indicates an X-ray diffraction pattern of the graphite powder relating to the embodiment 2 of the present invention.

In accordance with the embodiment 2, raw graphite was pulverized by a jet mill to less than 100 μm in particle diameter. Then, the graphite powder was immersed into a mixed acid comprised of sulfuric acid and nitric acid for a whole day. Subsequently, washing with distilled water and neutralization with a dilute aqueous solution of sodium hydroxide were performed. The graphite powder obtained by the above process was dried at 120° C. to obtain the graphite powder of the present invention. The X-ray pattern of the graphite powder obtained by the above process is shown in FIG. 5. The peaks at diffraction angles of 43.3 degrees and 46.0 degrees, both of which belong to the rhombohedral structure, are decreased. Accordingly, it was found that the rhombohedral structure was eliminated by the above process.

Embodiment 3

In accordance with the embodiment 3, a carbon electrode was prepared using the graphite powder of the present invention as an electrode active material, and the lithium intercalation-deintercalation capacity, in other words, the load capacity of the negative electrode in the lithium secondary battery, was studied with the electrode.

Mixed agents slurry were prepared by mixing 90% by weight in total solid of the graphite powder of the present invention prepared in the embodiment 1, 10% by weight of polyvinylidene fluoride (PVDF) as a binder, and N-methyl-2-pyrolidone, of which the heating temperatures were 900° C. and 2850° C., respectively. The mixed agents slurry was applied on a plane of a sheet of copper foil of 10 μm thickness, and dried in a vacuum at 120° C. for one hour. After the vacuum drying, an electrode was fabricated by roller pressing, of which the thickness was in a range of 85–90 μm. The average amount of the applied mixed agents per unit area was 10 mg/cm$^2$. The electrode was prepared by cutting the copper foil with the applied mixed agents into a sheet of 10 mm sheet X 10 mm.

Figure 6:
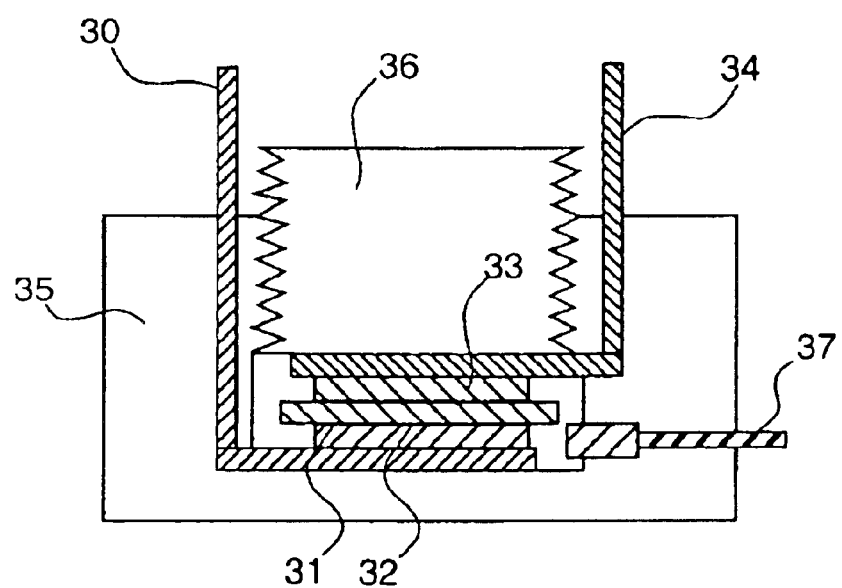
FIG. 6 is a schematic cross section of the battery used in the embodiment 3 and the comparative example 2.

FIG. 6 is a schematic cross section of a battery used for studying the lithium intercalation-deintercalation capacity of the present electrode. The battery has a structure, wherein a working electrode current collector 30, the electrode of the present invention 31, which is a working electrode, a separator 32, a lithium metal element 33, which is a counter electrode, and a counter electrode current collector 34 are piled and inserted into a battery vessel 35, and a battery lid 36 is screwed on for fixing. A reference electrode made of lithium metal 37 is attached to the battery. As for the electrolytic solution, a mixed solvent of ethylene carbonate and diethylcarbonate at a ratio of 1:1 in volume and lithium hexafluorophosphate were used with a lithium concentration of 1 mol/l.

The intercalation-deintercalation of lithium was repeated by applying a constant current between the working electrode and the counter electrode, and the capacity was determined. The terminated potentials of the intercalation and the deintercalation of the working electrode were set as 0 V and 0.5 V, respectively.

Comparative Example 2

In order to provide a comparison with the embodiment of the present invention, a carbon electrode was prepared with the graphite powder obtained in the comparative example 1 by the same method as the embodiment 3, and the load capacity (the amount of lithium intercalation-deintercalation) was determined. The same study was performed on the electrode prepared with the conventional graphite powder (the same powder as the raw powder in the embodiment 1).

Figure 7:
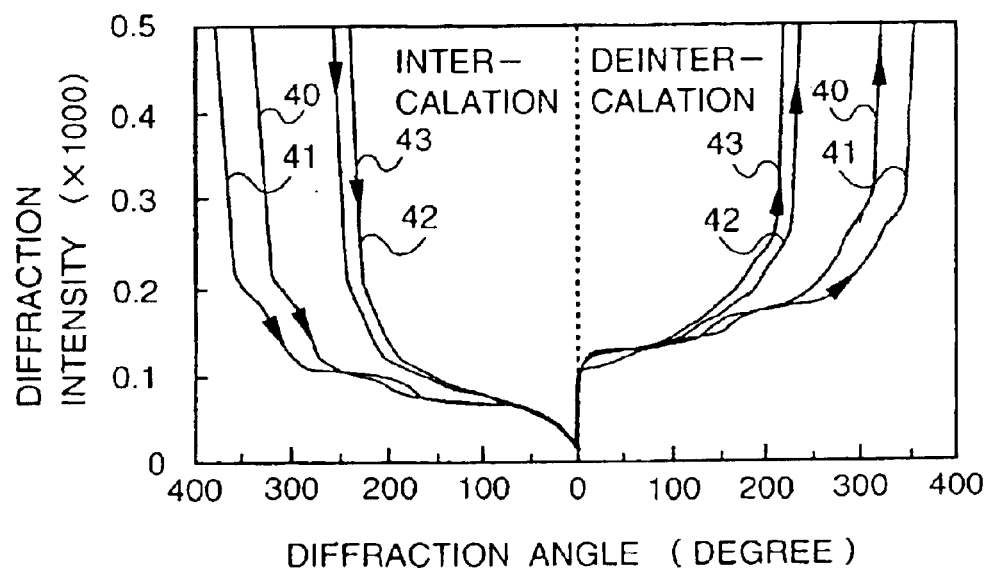
FIG. 7 is a graph indicating a relationship between the electrode potential and the lithium intercalation-deintercalation capacity.

A result of comparison on the lithium intercalation-deintercalation behavior of the electrode in the embodiment 3 (the present invention) with the electrode in the comparative example 2 (prior art) and the electrode prepared with the conventional graphite powder will be explained hereinafter. FIG. 7 is a graph indicating a relationship between the lithium intercalation-deintercalation capacity and the electrode potential at the fifth cycle, wherein the capacity becomes stable, after repeating the intercalation-deintercalation of lithium. In FIG. 7, the curve 40 indicates the potential variation of the electrode prepared with the graphite powder, of which the heating temperature during the heat treatment was 900° C., in the embodiment 3. The curve 41 indicates the potential variation of the electrode prepared with the graphite powder, of which the heating temperature during the heat treatment is 2850° C., in the embodiment 3. The curve 42 indicates the potential variation of the electrode prepared with the conventional graphite powder, and the curve 43 indicates the potential variation of the electrode prepared with the graphite powder which has been prepared in the comparative example 1 by the reversely ordered processes. The intercalation capacity and the deintercalation capacity for lithium in both the cases of using the conventional graphite in the comparative example 2 (the curve 42) and the graphite in the comparative example 1 (the curve 43) were less than 250 mAh/g per unit weight of the active materials. On the contrary, in the case of the embodiment 3 (the curves 40, 41), wherein the graphite powder prepared in the embodiment 1 was used as the active material, both the intercalation capacity and the deintercalation capacity for lithium were more than 300 mAh/g per unit weight of the active materials. That means that a large load capacity was obtained by using the graphite powder having a small existing fraction of the rhombohedral structure relating to the present invention. Furthermore, the case (the curve 41) using the graphite powder highly purified by heating up to 2850° C. indicates the largest values in both the intercalation capacity and the deintercalation capacity for lithium in FIG. 7.

Embodiment 4

The embodiment 4 was performed in order to confirm the influence of treating time in the heat treatment of the present invention. In the embodiment 4, the graphite powder of the present invention was obtained in substantially the same manner as the embodiment 1 (under a nitrogen atmosphere, the raw powder was heated at 2850° C.). However, the treating time of the heat treatment was varied in a range from 0 hours to 30 days.

The existing fraction of the rhombohedral structure was determined from the peak intensity in X-ray diffraction patterns. Furthermore, as in the embodiment 3, the electrodes were prepared with the obtained graphite powders, and the intercalation-deintercalation reactions of lithium were repeatedly performed. The result on the lithium intercalation-deintercalation capacity at the fifth cycle is shown in Table 1.

| Heating time | The existing fraction of the rhombohedral structure (%) | Lithium intercalation capacity (mAh/g) | Lithium deintercalation capacity (mAh/g) |
|---|---|---|---|
| 0 hours | 27.3 | 249 | 235 |
| 4 hours | 18.2 | 332 | 320 |
| 10 hours | 14.6 | 345 | 325 |
| 1 day | 13.8 | 343 | 334 |
| 3 days | 11.3 | 355 | 338 |
| 5 days | 9.7 | 368 | 351 |
| 10 days | 7.1 | 365 | 360 |
| 30 days | 3.9 | 366 | 361 |

In accordance with the above result, it is apparent that the smaller the existing fraction of the rhombohedral structure is, the more will the lithium intercalation-deintercalation capacity be increased. In particular, an existing fraction equal to or less than 10% is desirable.

Embodiment 5

Figure 8:
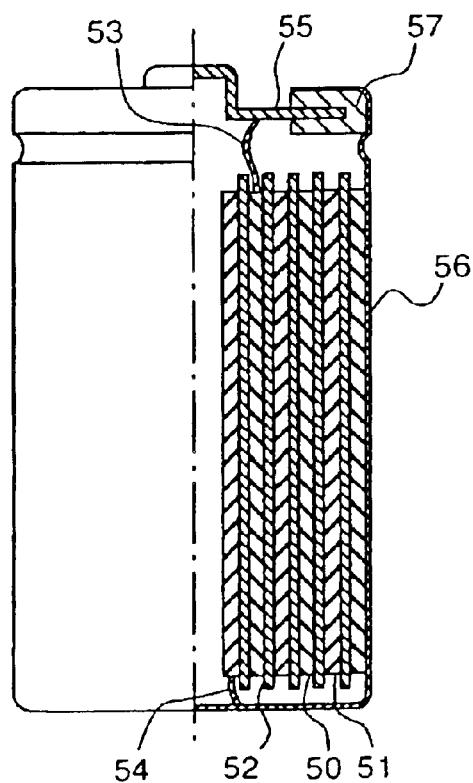
FIG. 8 is a partial cross section of the lithium secondary battery prepared in the embodiment 5 of the present invention.

The present embodiment uses a cylindrical lithium secondary battery. A fundamental structure of the secondary battery is shown in FIG. 8. In FIG. 8, the member identified by the reference numeral 50 is a positive electrode. Similarly, a negative electrode 51, a separator 52, a positive electrode tab 53, a negative electrode tab 54, a positive electrode lid 55, a battery vessel 56, and a gasket 57 are shown. The lithium secondary battery shown in FIG. 8 was prepared by the following steps. Mixed positive electrode agents slurry was prepared by mixing 88% by weight in total solid of $LiCoO_2$ as an active material for the positive electrode, 7% by weight of acetylene black as a conductive agent, 5% by weight of polyvinylidene fluoride (PVDF) as a binder, and N-methyl-2-pyrrolidone.

Similarly, mixed negative electrode agents slurry was prepared by mixing 90% by weight in total solid of the graphite powder of the present invention as an active material for the negative electrode, 10% by weight of polyvinylidene fluoride (PVDF) as a binder, and N-methyl-2-pyrrolidone.

The mixed positive electrode agents slurry was applied onto both planes of a sheet of aluminum foil of 25 µm thickness, and dried in a vacuum at 120° C. for one hour. After the vacuum drying, an electrode of 195 µm thickness was fabricated by roller pressing. The average amount of the applied mixed agents per unit area was 55 mg/cm². The positive electrode was prepared by cutting the aluminum foil with the applied mixed agents into a sheet 40 mm in width and 285 mm in length. However, portions of 10 mm in length from both ends of the positive electrode were not applied with the mixed agents for the positive electrode, the aluminum foil was bared, and one of the bared portions was welded to the positive electrode tab by ultrasonic bonding.

The mixed negative electrode agents slurry was applied onto both planes of a sheet of copper foil of 10 µm thickness, and dried in a vacuum at 120° C. for one hour. After the vacuum drying, an electrode of 175 µm thickness was fabricated by roller pressing. The average amount of the applied mixed agents per unit area was 25 mg/cm². The negative electrode was prepared by cutting the copper foil with the applied mixed agents into a sheet 40 mm in width and 290 mm in length. However, as with the positive electrode, portions 10 mm in length from both ends of the negative electrode were not applied with the mixed agents for the negative electrode, the copper foil was bared, and one of the bared portions was welded to the negative electrode tab by ultrasonic bonding.

A fine pored film made of polypropylene of 25 µm thickness and 44 mm in width was used as a separator. The positive electrode, the separator, the negative electrode, and the separator were piled in the order described above, and the pile was rolled to form a bundle of electrodes. The bundle was contained in a battery vessel, the negative electrode tab was welded to the bottom of the battery vessel, and a drawn portion for caulking the positive electrode lid was fabricated. An electrolytic solution prepared by adding lithium hexafluorophosphate by 1 mol/l into a mixed solvent containing ethylene carbonate and diethylcarbonate by 1:1 in volume was filled in the battery vessel, the positive electrode tab was welded to the positive electrode lid, and the positive electrode lid was caulked to the battery vessel to form the battery.

Using the battery which had been prepared by the above steps, charging and discharging were repeated under a condition in which the charging and discharging current was 300 mA, and respective ones of the terminated potentials of the charging and the discharging were 4.2 V and 2.8 V. Furthermore, the charging and the discharging currents were varied in a range from 300 mA to 900 mA, and rapid charging and rapid discharging were performed.

Comparative Example 3

In order to provide a comparison with the present invention, a lithium secondary battery was manufactured by the same method as embodiment 5 using the conventional graphite powder (the raw powder for the graphite powder of the present invention), and the battery characteristics were determined in the same way as embodiment 5.

The result of comparison of the characteristics of the lithium secondary battery of the embodiment 5 (the present invention) and the comparative example 3 (prior art) will be explained hereinafter.

Figure 9:
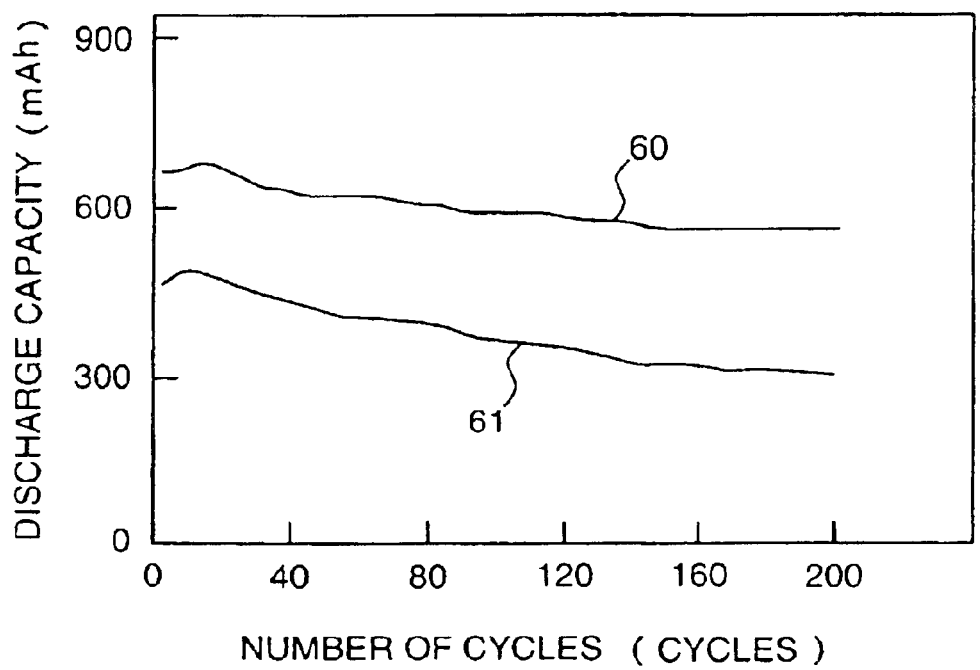
FIG. 9 is a graph indicating a relationship between the discharge capacity and the number of repetitions of the charge and the discharge cycles.

FIG. 9 indicates a variation in discharge capacity of the lithium secondary battery when the charging and discharging of the battery were repeated. The curve 60 indicates the discharge capacity of the embodiment 5. The curve 61 indicates the discharge capacity of the comparative example 3. In the embodiment 5, the maximum discharge capacity was 683 mAh, and the ratio in the discharge capacity after 200 cycles to the maximum capacity was 86%. While, in the comparative example 3, the maximum discharge capacity was 492 mAh, and the ratio in the discharge capacity after 200 cycles to the maximum capacity was 63%.

Figure 10:
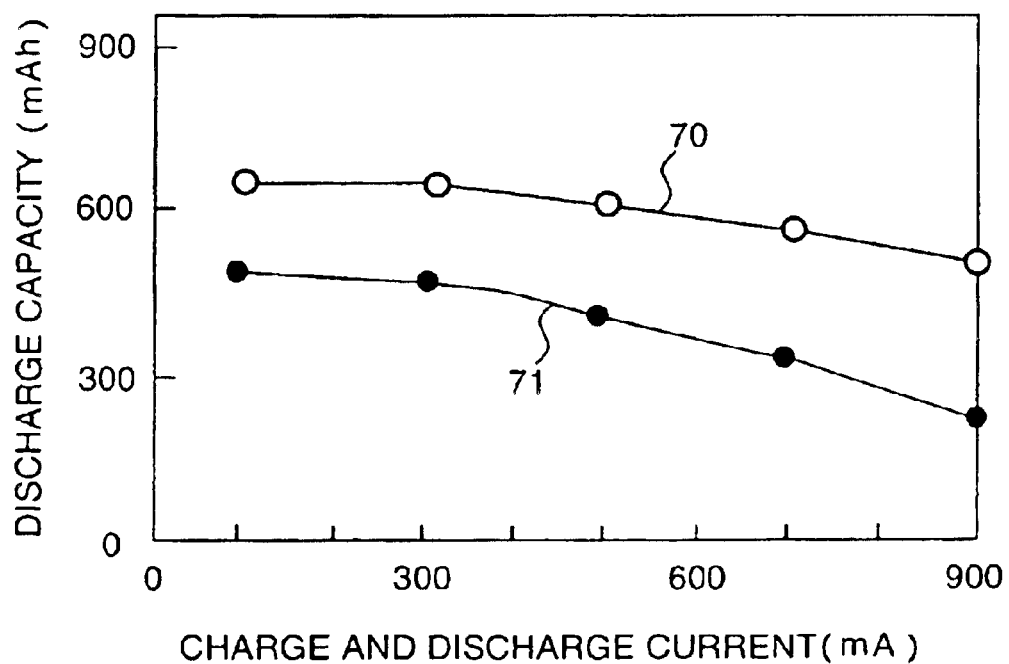
FIG. 10 is a graph indicating a relationship between the discharge capacity and the charging and discharging current.

FIG. 10 indicates a relationship between the charging current and discharging current and the discharge capacity when rapid charging and rapid discharging were performed. The curve 70 indicates the discharge capacity of the embodiment 5. The curve 71 indicates the discharge capacity of the comparative example 3. With a charging current and discharging current of 900 mA, the discharge capacity of the embodiment 5 was 573 mAh, while the discharge capacity of the comparative example 3 was 256 mAh. The ratio of decrease of the discharge capacity in the respective ones of the present cases to the discharge capacity in the case of the charging and discharging current of 300 mAh/g were 16% and 48%, respectively. Therefore, by using the graphite powder of the present invention as the active material for the negative electrode, the ratio of decrease of the capacity was improved by at least 30%, and it became apparent that the lithium secondary battery relating to the present invention had an excellent characteristics for rapid charging and discharging.

Embodiment 6

Mixed positive electrode agents slurry was prepared using $LiMn_2O_4$ as a positive electrode active material, and the positive electrode was prepared by applying the mixed positive electrode agents slurry onto both planes of a sheet of aluminum foil in the same manner as embodiment 5. The average amount of the applied mixed agents per unit area was 65 mg/cm$^2$, and the electrode thickness after fabrication by roller pressing was 230 μm. The positive electrode was prepared by cutting the aluminum foil with the applied mixed agents into a sheet 40 mm in width and 240 mm in length. However, portions 10 mm in length from both ends of the positive electrode were not applied with the mixed agents for the positive electrode. The negative electrode was the same as the negative electrode prepared in the embodiment 5. Then, the lithium secondary battery of the present embodiment was prepared by the same method as the embodiment 5, such as by forming an electrodes bundle, inserting the electrodes bundle into a vessel, welding a bottom of the vessel, adding an electrolytic solution, caulking a positive electrode lid, and others.

Using the battery, charging and discharging were repeated under a condition of a charging and discharging current of 300 mA, and the terminated potential of the charging and discharging of 4.2 V and 2.8 V, respectively. As a result, the maximum discharge capacity was 581 mAh, and the ratio of the discharge capacity after repeating the charging and discharging reactions 200 cycles to the maximum discharge capacity was 84%. The above result indicates that the charging and discharging characteristics of the present embodiment are superior to the comparative example 3.

A lithium secondary battery which has a high energy density and excellent charging and discharging characteristics can be obtained by using the graphite powder, which is superior in reversibility of the intercalation-deintercalation reaction of lithium, of which the maximum particle size is less than 100 μm, wherein the existing fraction of the rhombohedral structure in the crystalline structure is less than 20%, as the active material for the negative electrode of the battery.

What is claimed is:

1. A non-aqueous secondary battery, made by a method comprising the steps of:

laminating electrodes with graphite for a positive electrode and with a lithium group oxide for a negative electrode; and enclosing said electrodes laminated with graphite into a cell vessel with an electrolyte solution, wherein said electrodes laminated with graphite are manufactured by the steps of:

pulverizing the graphite to graphite powder having a particle size equal to or smaller than 100 μm, treating said graphite powder by heating at 900° C. or higher, after said pulverizing, the treated graphite powder having a fraction with rhombohedral structure that is equal to or less than 20% by weight, wherein said treating said graphite powder by heating is performed so as to modify crystallinity of the graphite powder such that the fraction of the graphite powder having rhombohedral structure is equal to or less than 20% by weight, and fabricating said graphite electrodes by subjecting the heat-treated graphite powder to pressing.

2. A non-aqueous secondary battery according to claim 1, wherein, in said treating said graphite powder by heating, said crystallinity of the graphite powder is modified so that a fraction of the graphite powder having hexagonal structure is equal to or greater than 80% by weight.

3. A non-aqueous secondary battery according to claim 2, wherein crystallinity of the graphite powder is modified during the heat treatment so that a fraction of the graphite powder having rhombohedral structure is equal to or less than 10% by weight.

4. A method of manufacturing a lithium secondary battery, comprising the steps of:

laminating electrodes with graphite for a positive electrode and with a lithium group oxide for a negative electrode; and enclosing said electrodes laminated with graphite into a cell vessel with an electrolyte solution, wherein said electrodes laminated with graphite are manufactured by the steps of:

pulverizing the graphite to graphite powder having a particle size equal to or smaller than 100 μm, treating said graphite powder by heating at 900° C. or higher, after said pulverizing, and fabricating said electrodes laminated with graphite by subjecting the heat-treated graphite powder to pressing.

5. A method of manufacturing a lithium secondary battery, comprising the steps of:

laminating electrodes with graphite for a positive electrode and with a lithium group oxide for a negative electrode; and enclosing said electrodes laminated with graphite into a cell vessel with an electrolyte solution, wherein said electrodes laminated with graphite are manufactured by the steps of:

pulverizing the graphite to graphite powder having a particle size equal to or smaller than 100 μm, immersing said graphite powder into an acidic solution as an immersing treatment, washing said graphite powder, neutralizing said graphite powder, and drying said graphite powder, and fabricating said electrodes laminated with graphite by subjecting the dried graphite powder to pressing.

6. A method of manufacturing a lithium secondary battery according to claim 5, wherein said acidic solution contains at least one compound selected from a group consisting of sulfuric acid, nitric acid, perchloric acid, phosphoric acid and fluoric acid.

7. A method of manufacturing a lithium secondary battery, comprising the steps of:

fabricating graphite electrodes by subjecting graphite powder to pressing;

laminating said graphite electrodes with a lithium group oxide; and enclosing said graphite electrodes into a cell vessel with an electrolyte solution, wherein said graphite powder is manufactured by a method comprising the steps of:

graphitizing raw graphite by heating raw graphite to at least 2000° C., to produce graphitized raw graphite;

pulverizing said graphitized raw graphite, to produce pulverized graphite;

sieving said pulverized graphite for obtaining graphite powder having a maximum particle diameter of 100 μm; and either (a) heating said graphite powder as a heat treatment for transforming the crystalline structure to hexagonal structure, and further heating said graphite powder, at a higher temperature than said heat treatment for transforming the crystalline structure, for eliminating impurities; or (b) immersing said graphite powder into an acidic solution as an immersing treatment, washing with water, neutralizing and drying.

8. A non-aqueous secondary battery manufactured by the process of claim 7.

9. A method of manufacturing a non-aqueous secondary battery, comprising the steps of:

laminating graphite electrodes with a lithium group oxide; and enclosing said graphite electrodes into a cell vessel with an electrolyte solution, wherein said graphite electrodes are manufactured by the steps of:

granulating the graphite to graphite powder having a particle size equal to or smaller than 100 μm, (a) treating said graphite powder by heating at 900° C. or higher, after said granulating, or (b) immersing said graphite powder into an acidic solution as an immersing treatment, washing said graphite powder, neutralizing said graphite powder, and drying said graphite powder, and after said (a) treating or said (b) immersing, fabricating said graphite powder electrodes by subjecting the heat-treated graphite powder to pressing.

10. A non-aqueous secondary battery manufactured by the process of claim 9.

* * * * *